(12) United States Patent
Huang et al.

(10) Patent No.: US 12,120,753 B2
(45) Date of Patent: Oct. 15, 2024

(54) COMMUNICATION APPARATUS AND COMMUNICATION METHOD FOR MULTI-BAND RANDOM ACCESS

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 610 days.

(21) Appl. No.: 17/293,864

(22) PCT Filed: Oct. 30, 2019

(86) PCT No.: PCT/SG2019/050530
§ 371 (c)(1),
(2) Date: May 13, 2021

(87) PCT Pub. No.: WO2020/112021
PCT Pub. Date: Jun. 4, 2020

(65) Prior Publication Data
US 2022/0015141 A1  Jan. 13, 2022

(30) Foreign Application Priority Data
Nov. 28, 2018  (SG) .......................... 10201810672R

(51) Int. Cl.
*H04W 74/0833* (2024.01)
*H04W 72/0446* (2023.01)
*H04W 72/0453* (2023.01)

(52) U.S. Cl.
CPC ..... *H04W 74/085* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2018/0139761 A1* 5/2018 Park ................... H04W 74/0808
2018/0199271 A1  7/2018 Viger et al.
(Continued)

OTHER PUBLICATIONS

Hart et al., "Recommended Direction for EHT," IEEE 802.11-18/1549r0, dated Sep. 9, 2018, 19 pages.
(Continued)

*Primary Examiner* — Rebecca E Song
(74) *Attorney, Agent, or Firm* — Seed IP Law Group LLP

(57) ABSTRACT

A station apparatus includes a receiver and a controller. The receiver, in operation, receives a Trigger frame allocating Random Access Resource Units (RA-RUs) over multiple bands. The Trigger frame includes a User Info field that comprises a Band Indication subfield for specifying a first band among the multiple bands, an RU Allocation subfield for indicating a first RA-RU of one or more contiguous RA-RUs in the first band, and a Number of RA-RU subfield for indicating a number of the contiguous RA-RUs minus one in the first band. The controller, in operation: sets a first Orthogonal Frequency Division Multiple Access (OFDMA) random access backoff (OBO) counter to 0 if an initial value of the first OBO counter is not larger than a number of eligible RA-RUs in the first band, which is a subset of contiguous RA-RUs in the Trigger frame; and randomly selects one of the eligible RA-RUs.

15 Claims, 9 Drawing Sheets

(56) References Cited

U.S. PATENT DOCUMENTS

| | | | | |
|---|---|---|---|---|
| 2018/0255589 A1* | 9/2018 | Patil | ..................... | H04W 52/146 |
| 2018/0338325 A1* | 11/2018 | Ryu | ...................... | H04W 72/23 |
| 2019/0297674 A1* | 9/2019 | Min | ...................... | H04W 80/08 |
| 2020/0037395 A1* | 1/2020 | Ko | ......................... | H04W 76/11 |
| 2021/0051728 A1* | 2/2021 | Viger | ................ | H04W 74/0808 |
| 2021/0076423 A1* | 3/2021 | Ahn | .................. | H04W 74/0833 |
| 2021/0329547 A1* | 10/2021 | Kim | .................. | H04W 52/0229 |
| 2023/0413334 A1* | 12/2023 | Dong | ........................ | H04L 5/00 |

OTHER PUBLICATIONS

International Search Report, dated Jan. 8, 2020, for corresponding International Application No. PCT/SG2019/050530, 3 pages.
Kim et al., "EHT features for Multi-Band Operation," IEEE 802.11-18/1525rl, dated Sep. 6, 2018, 12 pages.
Nezou et al., "CIDs related to UORA procedure—part 2," IEEE 802.11-18/694r2, dated Apr. 19, 2018, 7 pages.
Patil et al., "Resolution for CIDs related to Random Access," IEEE 802.11-18/1812r2, dated Oct. 15, 2018, 7 pages.
Viger et al., "CIDs related to UORA procedure—Part 1 (Initialization)," IEEE 802.11-18/0695r3, dated May 2018, 6 pages.

\* cited by examiner

COMMUNICATION APPARATUS AND COMMUNICATION METHOD FOR MULTI-BAND RANDOM ACCESS

TECHNICAL FIELD

The present disclosure is generally related to a communication apparatus and a communication method. In particular, the disclosure relates, but is not limited, to a communication apparatus and a communication method for wireless multi-band random access.

BACKGROUND ART

Reference to background art herein is not to be construed as an admission that such art constitutes common general knowledge.

In the standardization of next-generation Wireless Local Area Network (WLAN) technologies, a new radio access technology having backward compatibility with earlier standards, such as IEEE 802.11a/b/g/n/ac/ax technologies, has been discussed.

In order to increase peak throughput and capacity over 802.11ax HE (High Efficiency) WLAN, it has been considered to exploit multi-band operation over multiple frequency bands such as, for example, over the 2.4 GHz, 5 GHz, and 6 GHz bands.

Communication methods and apparatus for implementing multi-band Uplink Orthogonal Frequency Division Multiple Access (OFDMA) based Random Access (UORA) have not, however, been considered.

CITATION LIST

Non-Patent Literature

[NPL 1] IEEE 802.11-18/0695r3, CIDs Related to UORA Procedure Part 1 (Initialization), May 2018
[NPL 2] IEEE 802.11-18/0694r2, CIDs Related to UORA Procedure Part 2, April 2018
[NPL 3] IEEE 802.11-18/1525r1, EHT Features for Multi-Band Operation, September 2018
[NPL 4] IEEE 802.11-18/1549r0, Recommended Direction for EHT, September 2018

SUMMARY OF INVENTION

One non-limiting and exemplary embodiment facilitates providing multi-band Uplink Orthogonal Frequency Division Multiple Access (OFDMA) based Random Access (UORA).

In one general embodiment, the techniques disclosed here feature a communication apparatus operating in at least a first band and a second band, the communication apparatus comprising:
  a receiver which, in operation, receives a signal including a Trigger frame allocating at least one Random Access Resource Unit (RA-RU); and
  a controller which, in operation:
    sets a first Orthogonal Frequency Division Multiple Access (OFDMA) random access backoff (OBO) counter according to a number of RA-RUs determined to be eligible in at least one of the first and second bands in the received Trigger frame; and
    randomly selects an eligible RA-RU in each of the at least one of the first and second bands corresponding to the first OBO counter for Trigger Based (TB) Physical layer Protocol Data Unit (PPDU) transmission when the first OBO counter is set to 0;
  wherein the first OBO counter is initialized according to a first OFDMA Contention Window (OCW).

In another general embodiment, the techniques described here feature a communication method for uplink OFDMA based random access, the method comprising:
  initializing an OBO counter according to a first OCW;
  receiving a signal including a Trigger frame having at least one RA-RU;
  setting the first OBO counter according to a number of RA-RUs determined to be eligible in at least one of the first and second bands corresponding to a received Trigger frame; and
  randomly selecting an eligible RA-RU in each of the at least one of the first and second bands corresponding to the first OBO counter for TB PPDU transmission when the first OBO counter is set to 0.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may he individually obtained by the various embodiments and features of the specification and drawings, which need not all be provided in order to obtain one or more of such benefits and/or advantages.

BRIEF DESCRIPTION OF THE DRAWINGS

By way of example only, embodiments of the disclosure will be described more fully hereinafter with reference to the accompanying figures, wherein.

DETAILED DESCRIPTION

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
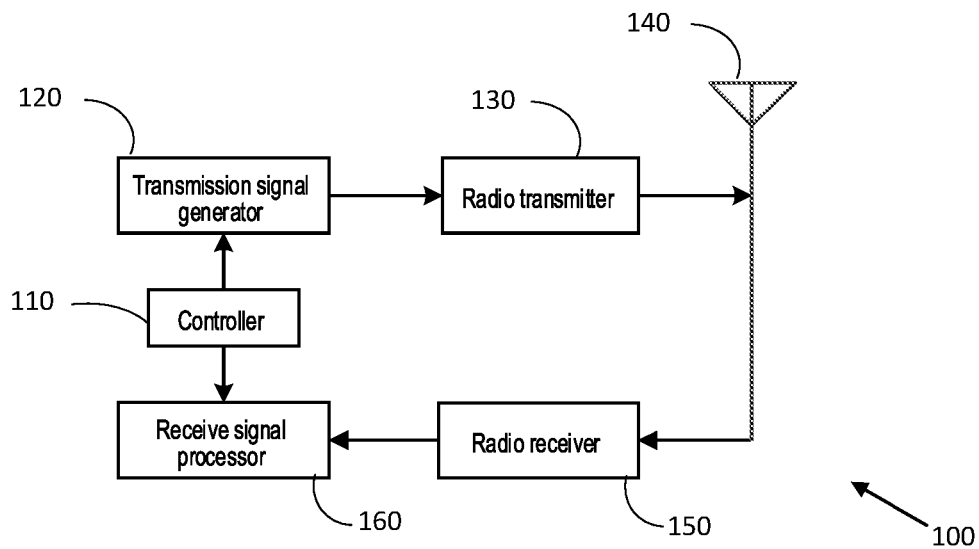
FIG. 1 illustrates an example wireless communications apparatus in the form of part of an access point (AP) or station (STA)

FIG. 1 illustrates an example wireless communications apparatus 100 in the form of part of an access point (AP) or station (STA), in which the present disclosure may be applied. The apparatus 100 of FIG. 1 has a controller 110 and signal generation circuitry in the form of a transmission signal generator 120 that generates signals under control of the controller 110. A radio transmitter 130 thereby transmits generated transmission signals via an antenna 140. The antenna 140 is also coupled to a radio receiver 150. Signal processing circuitry in the form of a receive signal processor 160 receives signals from the radio receiver 150 and processes them under control of the controller 110.

Transmitted and received signals may take any suitable form, but in the present disclosure the signal typically includes a Physical Layer Protocol Data Unit (PPDU) and the apparatus 100 may therefore be configured to, in operation, transmit and receive PPDUs. In the case of an AP the transmission signal generator 120 may generate a PPDU containing a Trigger frame and/or a Multi-STA BlockAck frame and the radio receiver 150 may receive an Extremely High Throughput (EHT) Trigger Based (TB) PPDU. In the case of a STA the transmission signal generator 120 may generate an EHT TB PPDU and the radio receiver 150 may receive a PPDU containing a Trigger frame and/or a Multi-STA BlockAck frame.

Inter-band channel aggregation can be utilized for higher data rates. An AP may establish a Basic Service Set (BSS) with its operating channel set to an inter-band aggregated channel which comprises two or more non-contiguous channels across multiple frequency bands. For example, using a 20, 40, 80 or 160 MHz channel in the 5 GHz band together with a 20, 40, 80 or 160 MHz channel in the 6 GHz band.

An AP may transmit a PPDU, such as EHT Single User (SU) PPDU, EHT Multi-User (MU) PPDU, or non-High Throughput (HT) duplicate PPDU for example, which carries one or more identical Trigger frames in aggregated channels across multiple frequency bands to trigger EHT TB PPDU transmission in an inter-band aggregated channel.

Figure 3:
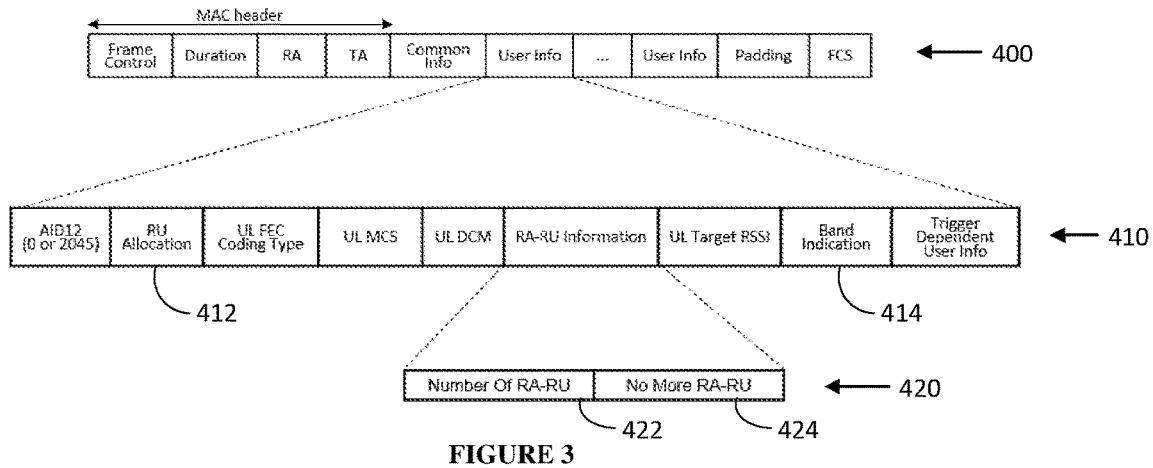
FIG. 3 illustrates an example format of a Trigger frame for random access.
Figure 14:
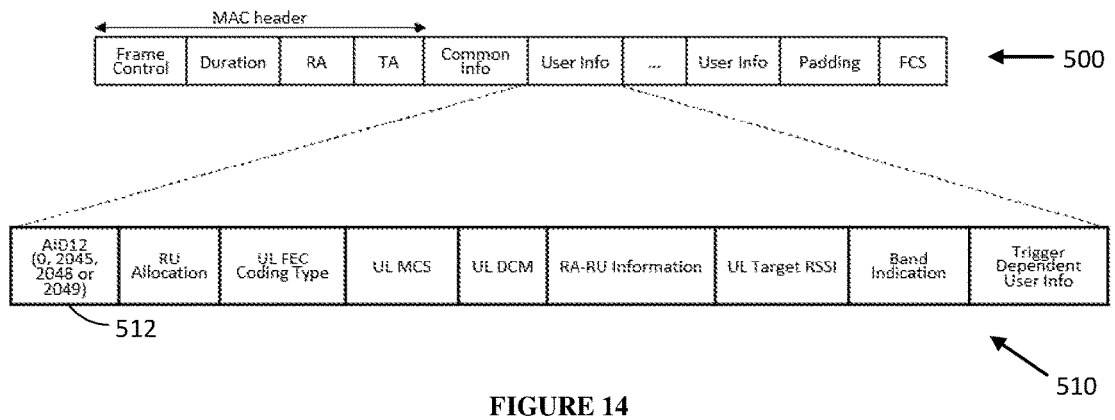
FIG. 14 illustrates another example format of a Trigger frame for random access.

In certain situations, such as to save power, a STA may await a Trigger frame only in one band (e.g. 5 GHz band) and may have circuitries for at least one other band (e.g. 6 GHz band) in a deactivated or low power 'sleep' mode. The STA may wake up the circuitries for the at least one other band upon identification of a multi-band Trigger frame being received. By adding a signaling that indicates a multi-band Trigger frame in a Common Info field of the Trigger frame as shown in FIG. 3 or FIG. 14 allows early detection of a multi-band Trigger frame. As a result, the AP may assign Random Access (RA) Resource Units (RUs) in the at least one other bands even if it knows the STA has the circuitries for the at least one other band in a deactivated or low power 'sleep' mode.

Figure 2:
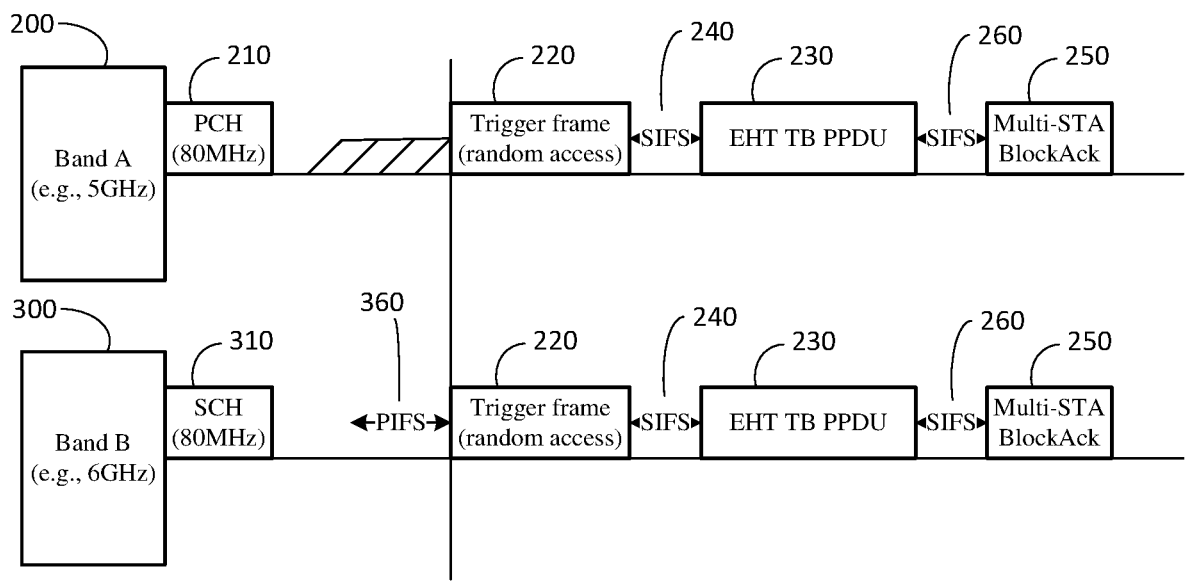
FIG. 2 illustrates an example message transfer in multi-band Uplink Orthogonal Frequency Division Multiple Access (OFDMA) based Random Access (UORA)

FIG. 2 illustrates an example message transfer in multi-band Uplink Orthogonal Frequency Division Multiple Access (OFDMA) based Random Access (UORA). Band A 200, which may be the 5 GHz band for example, may communicate over an 80 MHz Primary Channel (PCH) 210 and band B 300, which may be the 6 GHz band for example, may be communication over an 80 MHz Secondary Channel (SCH) 310. An AP performs Enhanced Distributed Channel Access (EDCA) in the PCH 210. When a backoff timer of the PCH 210 becomes zero, if the SCH 310 is idle during a certain period, e.g. Priority Interframe Spacing (PIFS) 360, the AP may transmit a non-HT duplicate PPDU 220 containing more than one identical Trigger frames in the aggregated PCH 210 and SCH 310. The Trigger frames allocate at least one RA-RUs in the PCH 210 and/or SCH 310. After a Short Interframe Spacing (SIFS) 240 following the reception of the at least one Trigger frames, if a STA wins RA contention, it transmits an EHT TB PPDU 230 in the PCH 210, in the SCH 310 or in the aggregated PCH 210 and SCH 310. The EHT TB PPDU 230 carries at least one Medium Access Control (MAC) Protocol Data Unit (MPDU) or Aggregate MPDU (A-MPDU) (collectively referred to as '(A)-MPDU'). After a SIFS 260, the AP may transmit a non-HT duplicate PPDU 250 containing more than one identical Multi-STA BlockAck frames in the aggregated PCH 210 and SCH 310. The Multi-STA BlockAck frames include the acknowledgement on the at least one (A)-MPDU in the received EHT TB PPDU 230.

FIG. 3 illustrates an example format of a Trigger frame 400 for RA that schedules RA-RUs in one or multiple frequency bands (e.g. 5 GHz and 6 GHz bands). The Trigger frame 400 includes a User Info field 410 which has its subfields shown in greater detail including a RU Allocation subfield 412, a Band Indication subfield 414 and a RA-RU Information subfield 420 indicating RA-RU information. The RA-RU Information subfield 420 includes a Number of RA-RU subfield 422 and a No More RA-RU subfield 424. The RU Allocation subfield 412 indicates the first RU of one or more contiguous RA-RUs in a band specified by a Band Indication subfield 414 of the User Info field 410. The Number Of RA-RU subfield 422 indicates the number of contiguous RA-RUs minus one in the band specified by the Band Indication subfield 414. If there is more than one RA-RU in a band, the sizes of all RA-RUs in the band are equal to the size of the first RU. All remaining subfields of the User Info field 410 apply to all the RA-RUs in the band.

Figure 4:
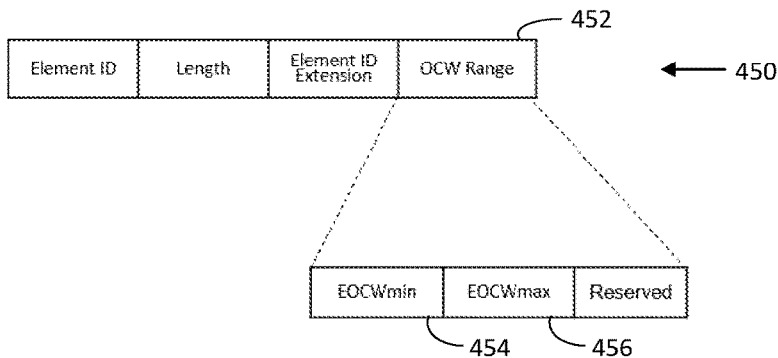
FIG. 4 illustrates an example UORA Parameter Set element according to a first embodiment.

FIG. 4 illustrates an example UORA Parameter Set element 450 according to a first embodiment. The UORA Parameter Set element 450 can be included in a management frame such as, for example, a Beacon frame, Probe Response frame, (Re)association Response frame, etc. The UORA Parameter Set element 450 contains an OFDMA Contention Window (OCW) Range field 452 that indicates an OCW range. The OCW Range field 452 contains an EOCWmin subfield 454 and an EOCWmax subfield 456 that indicate the OCW range. This may be achieved by having OCWmin being derived by the equation $2^{EOCWmin}-1$ and OCWmax being derived from the equation $2^{EOCWmax}-1$.

According to the first embodiment, a communication apparatus, such as a STA, shall maintain an internal OCW and OFDMA random access backoff (OBO) counter. Prior to an initial attempt of RA transmission, or after each successful RA transmission, the STA may set the value of OCW to OCWmin and may initialize its OBO counter to an integer value randomly selected from a uniform distribution in the range 0 to OCW. The OCWmin and OCWmax may be obtained from a most recently received UORA Parameter Set element (e.g. see FIG. 4) from an AP or, if a UORA Parameter Set element was not received, predefined default values.

Upon receipt of a Trigger frame containing at least one RA-RU determined to be eligible ('eligible RA-RU(s)') from an AP, if the OBO counter of a STA is not greater than a number of eligible RA-RUs in the Trigger frame, the STA sets its OBO counter to zero and randomly selects an eligible RA-RU in each of its operating band(s). Otherwise, the STA decrements its OBO counter by the number of eligible RA-RUs in the Trigger frame. A STA should not contend for an eligible RA-RU or decrement its OBO counter if it does not have pending frames for the AP.

An RA-RU is determined to be eligible if the STA is capable of generating an EHT TB PPDU (i.e. the STA supports all transmit parameters indicated in the Common Info field and in the User Info field corresponding to the RA-RU) and may satisfy at least one of the following conditions: (1) that the STA is not associated with a BSS that it intends to transmit frames to and a predetermined subfield of the User Info field of the Trigger frame, such as the AID12 subfield, is a first predetermined number, such as 2045; and (2) the STA is an associated STA and a Transmitter Address (TA) field of the Trigger frame is set to a BSS identifier (BSSID) of the associated BSS and the predetermined subfield of the User Info field of the Trigger frame, such as the AID12 subfield, is a second predetermined number, such as 0.

If all the selected RU(s) are considered busy as a result of either physical or virtual Carrier Sense (CS), a STA may not transmit EHT TB PPDU and the STA may set its OBO counter to a random value drawn from a uniform distribution in the range 0 to OCW. If only one of the selected RA-RU(s) is idle as a result of both physical and virtual CS, the STA may transmit an EHT TB PPDU in this idle RU.

If two RA-RUs are selected and both the selected RA-RUs are idle as a result of both physical and virtual CS then a STA may either down select one RU from both the selected RUs and transmits an EHT TB PPDU at this RU or transmit an EHT TB PPDU with the same (A)-MPDU in each of the selected RUs. Advantageously the probability for successful transmission of (A)-MPDU increases as a result.

Figure 5:
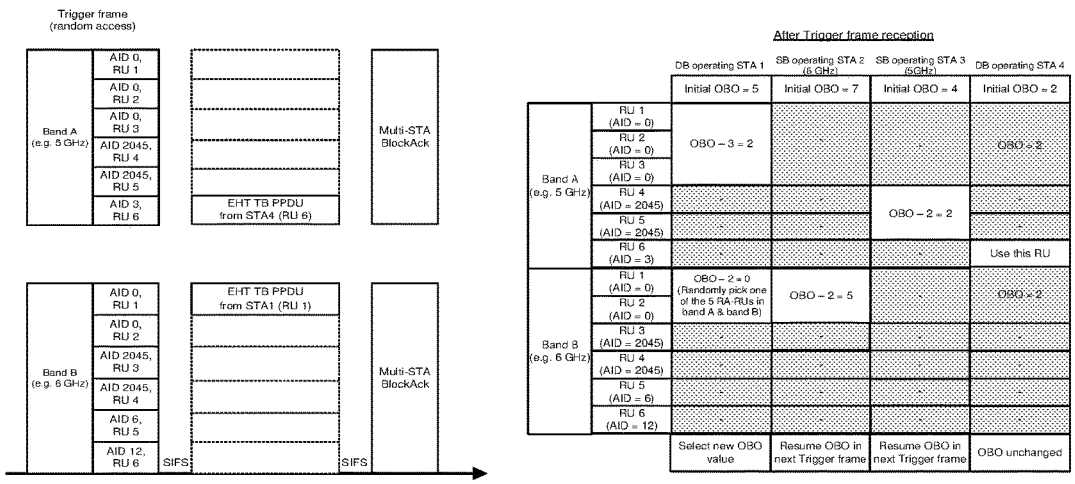
FIG. 5 illustrates an example multi-band UORA procedure according to the first embodiment.

FIG. 5 illustrates an example multi-band UORA procedure according to the first embodiment for a Dual Band (DB) operating STA 1 with an Association Identifier (AID) of 5, a 6 GHz Single Band (SB) operating STA 2 with an AID of 7, a 5 GHz SB operating STA 3 that is unassociated, and a DB operating STA 4 with an AID of 3. DB operating STAs are operating in both bands at a time (i.e. able to simultaneously transmit or receive frames at both bands) and SB operating STAs are operating in either of both bands at a time (i.e. able to transmit or receive frames at either of two bands at a time). An SB operating STA may be a SB only STA capable of supporting either of both bands or a DB capable STA which is capable of supporting both bands but has reduced its operating bands to either of both bands, such as for power saving purposes.

In the example of FIG. 5, before a Trigger frame was sent by an AP, STA 1, STA 2, STA 3 and STA 4 had initial OBO values of 5, 7, 4 and 2 respectively. Upon receiving the Trigger frame, STA 4, which is associated with the AP and has pending frames for the AP, is allocated a dedicated RU (RU6). STA 4 does not contend for RA-RUs and instead transmits its pending frames on RU6. STA 1, operating in both bands, associated with the AP and having pending frames for the AP, decrement its OBO counter by the number of eligible RA-RUs in both bands indicated in the Trigger frame (i.e., five RA-RUs in both bands with AID12 subfield equal to 0). Since STA 1's OBO counter decrements to 0, it transmits its pending frames on RU1 in 6 GHz band which it randomly selects from the eligible set of RUs (i.e., RU1, RU2 and RU3 in 5 GHz band and RU1 and RU2 in 6 GHz band). STA 2, operating in 6 GHz band, associated with the AP and having pending frames for the AP, decrement its OBO counter by the number of eligible RA-RUs in 6 GHz band indicated in the Trigger frame (i.e., two RA-RUs in 6 GHz band with AID12 subfield equal to 0). Since STA 2's OBO counter decrements to a nonzero value, it maintains the new OBO value (5) until it receives a later Trigger frame carrying RA-RUs for associated STAs. STA 3, which is operating in 5 GHz band, not associated with the AP but has a pending frame for the AP, decrements its OBO counter by the number of eligible RA-RUs in the 5 GHz band indicated in the Trigger frame (i.e., two RA-RUs in 5 GHz band with AID12 subfield equal to 2045). Since STA 3's OBO counter decrements to a nonzero value, it maintains the new OBO value (2) until it receives a later Trigger frame carrying RA-RUs for unassociated STAs.

If an EHT TB PPDU that solicits an immediate response is transmitted in a single selected RA-RU and the expected response is not received, the RA transmission is considered unsuccessful. Otherwise, the RA transmission is considered successful. Similarly, if an EHT TB PPDU with same (A)-MPDU that solicits an immediate response is transmitted in each of two selected RA-RUs and neither of the expected responses is received, the RA transmission is considered unsuccessful. Otherwise, the RA transmission is considered successful.

If an RA transmission is considered unsuccessful, the STA may, for example, update its OCW to 2*OCW+1 when the OCW is less than the value of OCWmax, and may randomly select its OBO counter in the range of 0 to OCW. Once the OCW reaches OCWmax for successive retransmission attempts, the OCW may remain at the value of OCWmax until the OCW is reset. A STA may update its OCW value as long as the updated OCW remains in the range OCWmin to OCWmax obtained from the most recently received UORA Parameter Set element. If the updated OCW becomes greater than OCWmax as consequence of receiving a modified UORA Parameter Set element, then the STA may set the value of OCW to the new OCWmax value.

Figure 6:
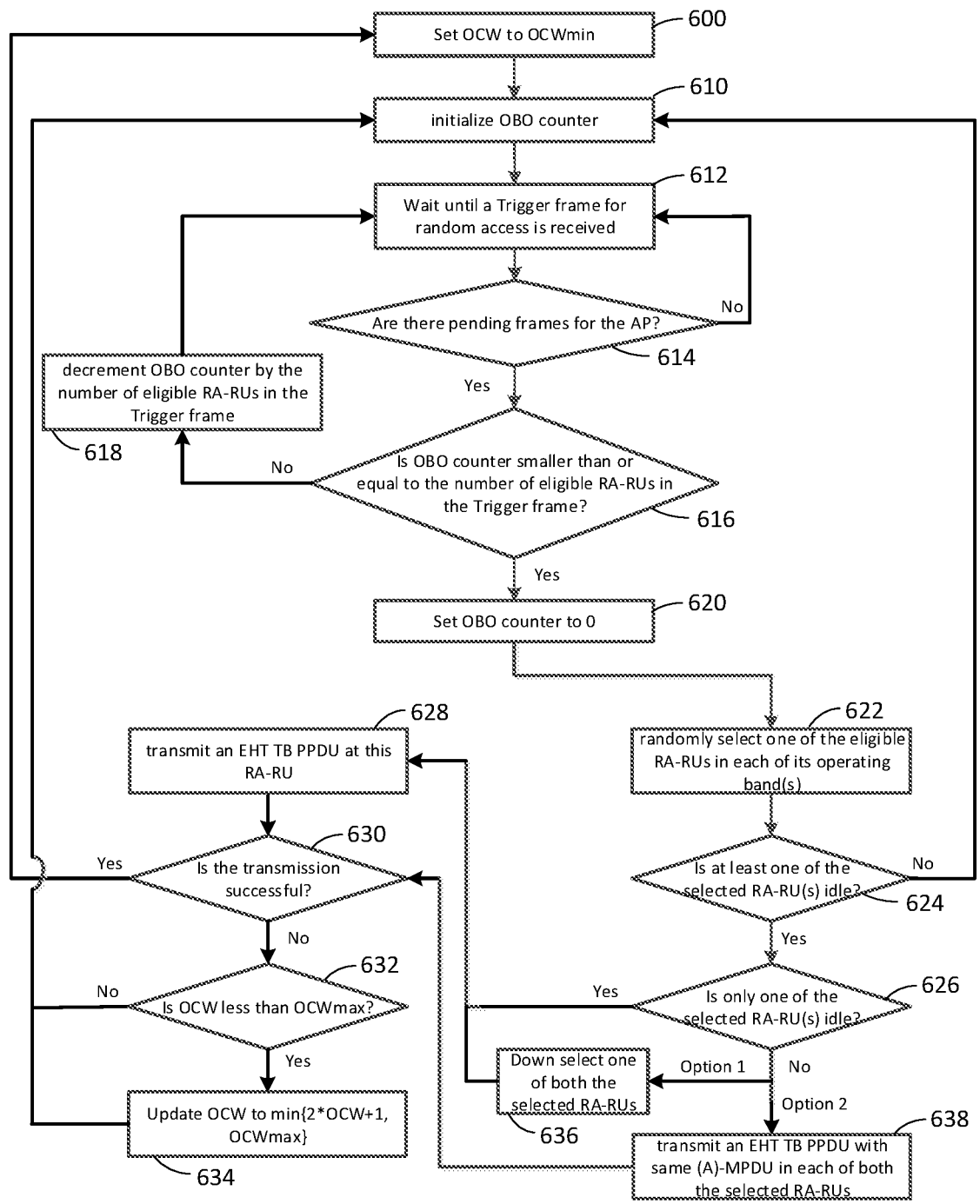
FIG. 6 illustrates a flow chart for an example method of implementing multi-band UORA according to the first embodiment.

FIG. 6 illustrates a flow chart for an example method of implementing multi-band UORA according to the first embodiment at a STA. The method starts by setting OCW to OCWmin at step 600 and then initializes the OBO counter at step 610 before waiting until a Trigger frame for RA is received at step 612. At step 614 a determination is made as to whether there are any pending frames for the AP. If not, then the STA reverts back to waiting until a Trigger frame for RA is received at step 612. If so, then a further determination is made as to whether the OBO counter is smaller than, or equal to, the number of eligible RA-RUs in the Trigger frame at step 616. If not, the OBO counter is decremented by the number of eligible RA-RUs in the Trigger frame at step 618 and the STA reverts back to waiting until a Trigger frame for RA is received at step 612. If so, the OBO counter is set to 0 at step 620.

Once the OBO counter is set to 0 at step 620, the STA randomly selects one of the eligible RA-RUs in each of its operating band(s) at step 622 and then a determination is made as to whether at least one of the selected RA-RU(s) is idle at step 624. If not, then the STA reverts back to initialize the OBO counter at step 610. If so, then a further determination is made as to whether only one of the selected RA-RU(s) is idle at step 626.

If only one of the selected RA-RU(s) is determined to be idle at step 626, the STA transmits an EHT TB PPDU at this RA-RU at step 628 and makes a determination as to whether the transmission was successful at step 630. If so, the STA goes back to the first step of setting OCW to OCWmin at step 600. If not, then a determination is made as to whether OCW is less than OCWmax at step 632 and, if so, OCW is updated to min{2*OCW+1, OCWmax} at step 634. The STA then goes back to initializing the OBO counter at step 610.

If more than one of the selected RA-RUs is determined to be idle at step 626, there are two proposed options. Option 1 is to down select one of both the selected RA-RUs at step 636 and then proceed to transmitting an EHT TB PPDU at this RA-RU at step 628. Option 2 is to transmit an EHT TB PPDU with the same (A)-MPDU in each of both the selected RA-RUs at step 638 and move on to determining whether the transmission was successful at step 630.

As may be appreciated, DB operating STAs are advantageous to SB operating STAs in UORA since DB operating STAs can contend all eligible RA-RUs in both bands while SB operating STAs can contend eligible RA-RUs in a single band and the same OCWmin and OCWmax are used by SB and DB operating STAs.

Figure 7:
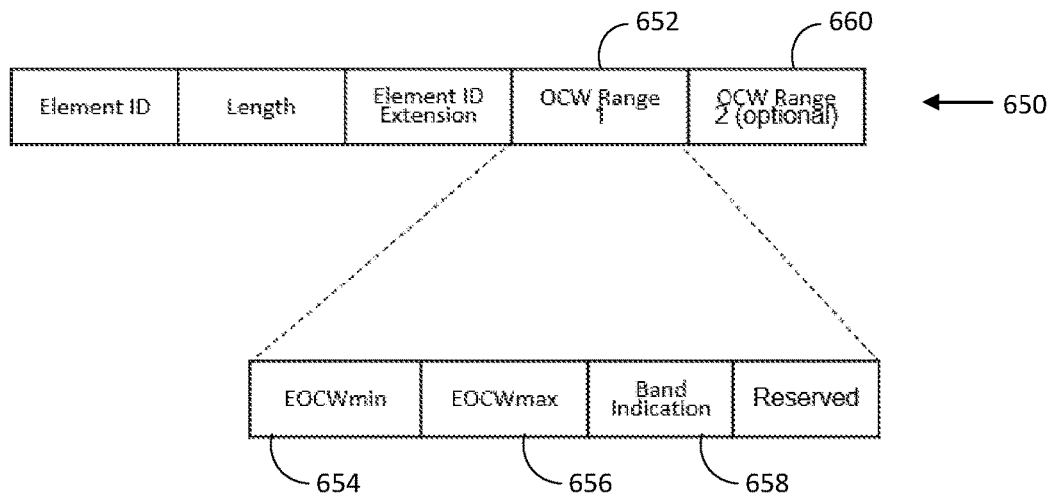
FIG. 7 illustrates an example UORA Parameter Set element according to a second embodiment.

FIG. 7 illustrates an example UORA Parameter Set element 650 according to a second embodiment whereby each band has a band-specific OCW range. For example, OCW5 min and OCW5max may represent an OCW range specific to the 5 GHz band and OCW6 min and OCW6max may represent an OCW range specific to the 6 GHz band. The OCW Range 1 field 652 and OCW Range 2 field 660 in the UORA Parameter Set element 650 indicate an OCW range, e.g. via an EOCWmin subfield 654 and an EOCWmax subfield 656, for the band indicated by the Band Indication subfield 658.

As with before, the UORA Parameter Set element 650 may be included in a management frame such as, for example, a Beacon frame, Probe Response frame, (Re) association Response frame, etc. However, when a UORA Parameter Set element is included in an individually addressed frame (e.g. (Re)association Response frame) it may only include the OCW range specific to the operating band(s) of the intended recipient for the individually addressed frame.

A SB operating STA may maintain a single internal OCW and a single internal OBO counter for its operating band. For a SB operating STA, the method of implementing UORA for the second embodiment could therefore be the same as for the first embodiment. A DB operating STA may maintain an internal OCW and internal OBO counter per band. For example, OCW5 and OBO5 counters may represent OCW and OBO counters specific to the 5 GHz first band and OCW6 and OBO6 counters may represent OCW and OBO counters specific to the 6 GHz second band. These bands (i.e. 5 GHz and 6 GHz) are for example only and it should be appreciated that other suitable frequency bands could be utilized. As may be appreciated, DB operating STAs have similar contention opportunities to SB operating STAs in UORA since the OCW and OBO counters are band-specific and DB operating STAs contend RA-RUs in each band independently.

For a DB operating STA to operate multi-band UORA there may be some options. For example, a first option is to independently operate a UORA procedure for a first band (e.g. 5 GHz band) and another UORA procedure for a second band (e.g. 6 GHz band). With this option, the STA behaves like two independent SB operating STAs with, for example, the operating bands of 5 GHz and 6 GHz respectively. A second option is to operate a single UORA procedure for both bands.

In the second embodiment, using the second option described above, a DB operating STA, prior to an initial attempt of RA transmission or after each successful RA transmission, sets values of OCW5 and OCW6 to OCW5 min and OCW6 min and then initializes its OBO5 counter to an integer value randomly selected from a uniform distribution in the range 0 to OCW5 and its OBO6 counter to an integer value randomly selected from a uniform distribution in the range 0 to OCW6.

After each partially successful RA transmission in the 5 GHz band, for example, a DB operating STA may set the value of OCW5 to OCW5 min and may initialize its OBO5 counter to an integer value randomly selected from a uniform distribution in the range 0 to OCW5. Similarly, after each partially successful RA transmission in the 6 GHz band, a DB operating STA may set the value of OCW6 to OCW6 min and may initialize its OBO6 counter to an integer value randomly selected from a uniform distribution in the range 0 to OCW6.

Upon the reception of a Trigger frame containing at least one eligible RA-RU from an AP, if the OBO5 counter of a DB operating STA is not greater than the number of eligible RA-RUs in the 5 GHz band in the Trigger frame, then the DB operating STA shall set its OBO5 counter to zero. Otherwise, the DB operating STA decrements its OBO5 counter by the number of eligible RA-RUs in the 5 GHz band in the Trigger frame. If the OBO6 counter of a DB operating STA is not greater than the number of eligible RA-RUs in the 6 GHz band in the Trigger frame, then the DB operating STA shall set its OBO6 counter to zero. Otherwise, the DB operating STA decrements its OBO6 counter by the number of eligible RA-RUs in 6 GHz band in the Trigger frame.

If both OBO5 and OBC6 counters are zero a DB operating STA may randomly select one of the eligible RA-RUs in each band. If only one of the OBO5 and OBC6 counters is zero, a DB operating STA may randomly select one of the eligible RA-RUs in the band whose corresponding OBO counter is set to 0.

If all selected RA-RU(s) are considered busy as a result of either physical or virtual CS, the STA may not transmit an EHT TB PPDU and the STA may instead set its OBO5 counter to a random value drawn from a uniform distribution in the range 0 to OCW5 and, similarly, set its OBO6 counter to a random value drawn from a uniform distribution in the range 0 to OCW6. If only one of the selected RA-RU(s) is idle as a result of both physical and virtual CS, the STA may transmit an EHT TB PPDU in this RU.

A few options are envisaged if two RA-RUs are selected and both the selected RUs are idle as a result of both physical and virtual CS. For example, option 1 is for the STA to down select one RU from both the selected RUs and transmits an EHT TB PPDU in this RU. Option 2 is for the STA to transmit an EHT TB PPDU with a same (A)-MPDU in each of both the selected RUs which should increase the probability for successful transmission of (A)-MPDU. Option 3 is for the STA to transmit an EHT TB PPDU with a different (A)-MPDU in each of both the selected RUs which should increase throughput.

Figure 8:
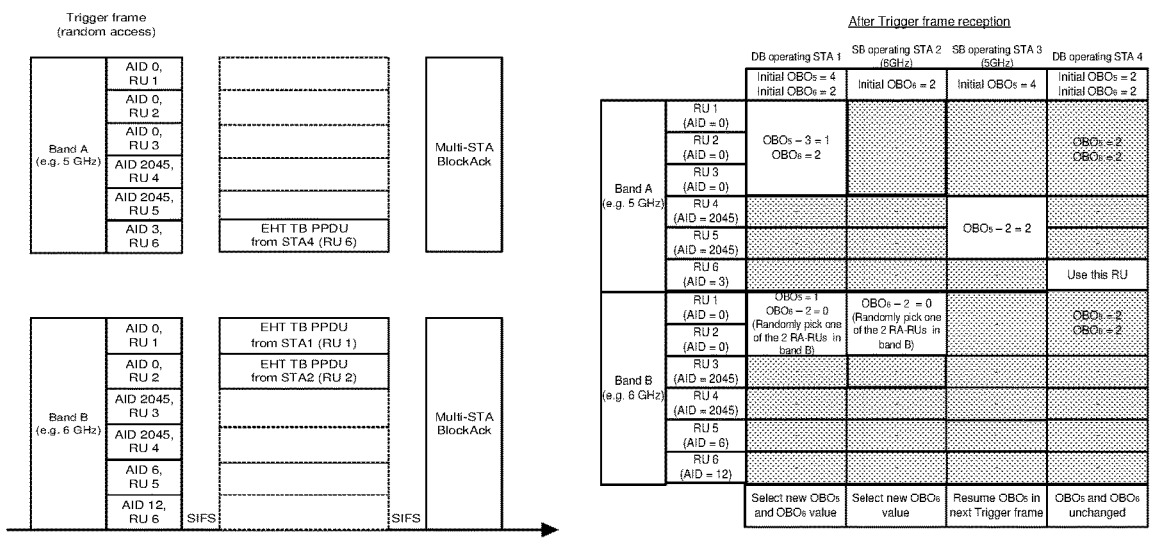
FIG. 8 illustrates an example multi-band UORA procedure according to the second embodiment.

FIG. 8 illustrates an example multi-band UORA procedure according to the second embodiment for a DB operating STA1 with an AID of 5, a 6 GHz SB operating STA2 with an AID of 7, a 5 GHz SB operating STA3 that is un-associated, and a DB operating STA4 with an AID of 3.

In the example of FIG. 8, before a Trigger frame was sent by the AP, STA 1 had initial OBO5 and OBO6 values of 4 and 2 respectively, STA 2 had initial OBO6 value of 2, STA 3 had initial OBO5 value of 4; and STA 4 had initial OBO5 and OBO6 values of 2. Upon receiving the Trigger frame, STA 4, which is associated with the AP and has pending frames for the AP, is allocated a dedicated RU (RU6). STA 4 does not contend for RA-RUs and instead transmits its pending frames on RU6. STA 1, operating in both bands, associated with the AP and having pending frames for the AP, decrement its OBO5 and OBO6 counter by the number of eligible RA-RUs in 5 GHz and 6 GHz bands indicated in the Trigger frame, respectively (i.e., three RA-RUs in 5 GHz band with AID12 subfield equal to 0 and two RA-RUs in 6 GHz band with AID12 subfield equal to 0). Since STA 1's OBO6 counter decrements to 0, it transmits its pending frames on RU1 in 6 GHz band which it randomly selects from the eligible set of RUs (i.e., RU1 and RU2 in 6 GHz band). STA 2, operating in 6 GHz band, associated with the AP and having pending frames for the AP, decrement its OBO6 counter by the number of eligible RA-RUs in 6 GHz band indicated in the Trigger frame (i.e., two RA-RUs in 6 GHz band with AID12 subfield equal to 0). Since STA 2's OBO6 counter decrements to 0, it transmits its pending frames on RU2 in 6 GHz band which it randomly selects from the eligible set of RUs (i.e., RU1 and RU2 in 6 GHz band). STA 3, which is operating in 5 GHz band, not associated with the AP but has a pending frame for the AP, decrements its OBO counter by the number of eligible RA-RUs in the 5 GHz band indicated in the Trigger frame (i.e., two RA-RUs in 5 GHz band with AID12 subfield equal to 2045). Since STA 3's OBO counter decrements to a nonzero value, it maintains the new OBO value (2) until it receives a later Trigger frame carrying RA-RUs for unassociated STAs.

In the second embodiment, RA transmissions are considered to be successful if: an EHT TB PPDU that solicits an immediate response is transmitted in a single selected RA-RU and the expected response is received, an EHT TB PPDU with a same (A)-MPDU that solicits an immediate response is transmitted in each of two selected RA-RUs and at least one of the expected responses is received, or an EHT TB PPDU with a different (A)-MPDU that solicits an immediate response is transmitted in each of two selected RA-RUs and both of the expected responses are received.

In the second embodiment, RA transmissions are considered to be unsuccessful if: an EHT TB PPDU that solicits an immediate response is transmitted in a single selected RA-RU and the expected response is not received or an EHT TB PPDU with a same (A)-MPDU or a different (A)-MPDU that solicits an immediate response is transmitted in each of two selected RA-RUs and neither of the expected responses is received.

An RA transmission is considered to be partially successful in the first (5 GHz) band and partially unsuccessful in the second (6 GHz) band if an EHT TB PPDU with a different (A)-MPDU that solicits an immediate response is transmitted in each of two selected RA-RUs and only the expected response in the first (5 GHz) band is received. An RA transmission is considered to be partially unsuccessful in the first (5 GHz) band and partially successful in the second (6 GHz) band if an EHT TB PPDU with a different (A)-MPDU that solicits an immediate response is transmitted in each of two selected RA-RUs and only the expected response in the second (6 GHz) band is received.

In the event that an RA transmission is considered to be unsuccessful, a STA may update its OCW5 to 2*OCW5+1 when the OCW5 is less than the value of OCW5max and update its OCW6 to 2*OCW6+1 when the OCW6 is less than the value of OCW6max. The STA may randomly select its OBO5 counter in the range of 0 and OCW5 and its OBO6 counter in the range of 0 and OCW6. Once the OCW5 reaches OCW5max, for successive retransmission attempts, the OCW5 shall remain at the value of OCW5max until the OCW5 is reset. Once the OCW6 reaches OCW6max, for successive retransmission attempts, the OCW6 shall remain at the value of OCW6max until the OCW6 is reset.

If the RA transmission is considered to be partially unsuccessful in the first (5 GHz) band, the STA may update its OCW5 to 2*OCW5+1 when the OCW5 is less than the value of OCW5max, and may randomly select its OBO5 counter in the range of 0 and OCW5. Once the OCW5 reaches OCW5max for successive retransmission attempts, the OCW5 may remain at the value of OCW5max until the OCW5 is reset.

If the RA transmission is considered to be partially unsuccessful in the second (6 GHz) band, the STA may update its OCW6 to 2*OCW6+1 when the OCW6 is less than the value of the OCW6max, and may randomly select its OBO6 counter in the range of 0 and OCW6. Once the OCW6 reaches OCW6max for successive retransmission attempts, the OCW6 shall remain at the value of OCW6max until the OCW6 is reset.

Figure 9:
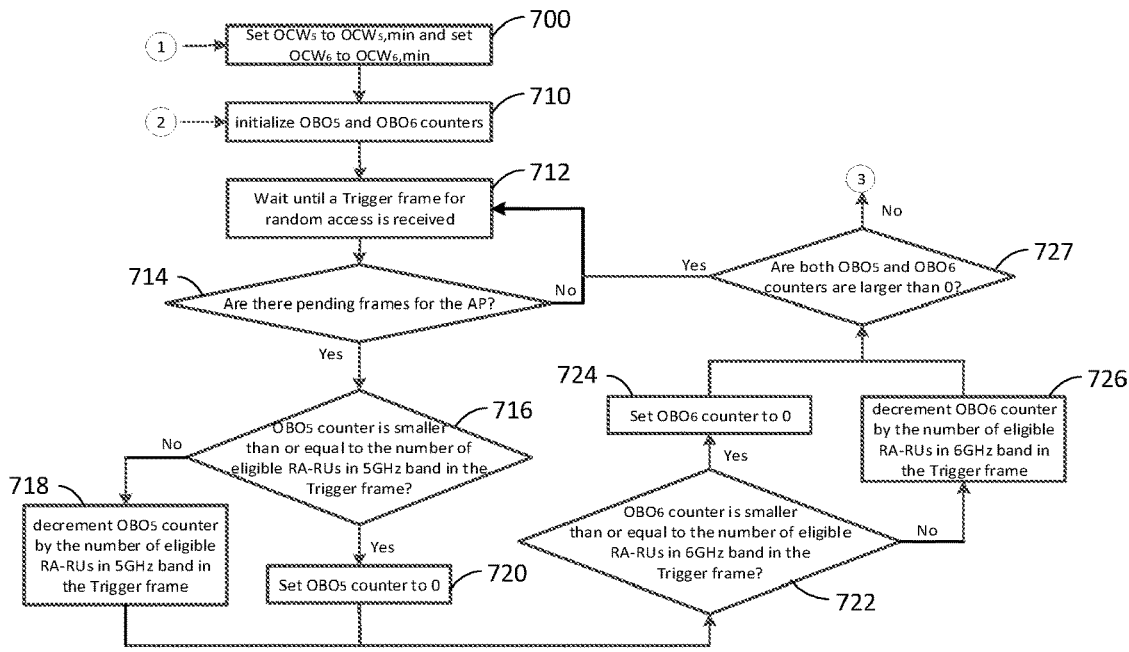
FIG. 9 illustrates a first part of a flow chart for an example method of implementing multi-band UORA according to the second embodiment.
Figure 10:
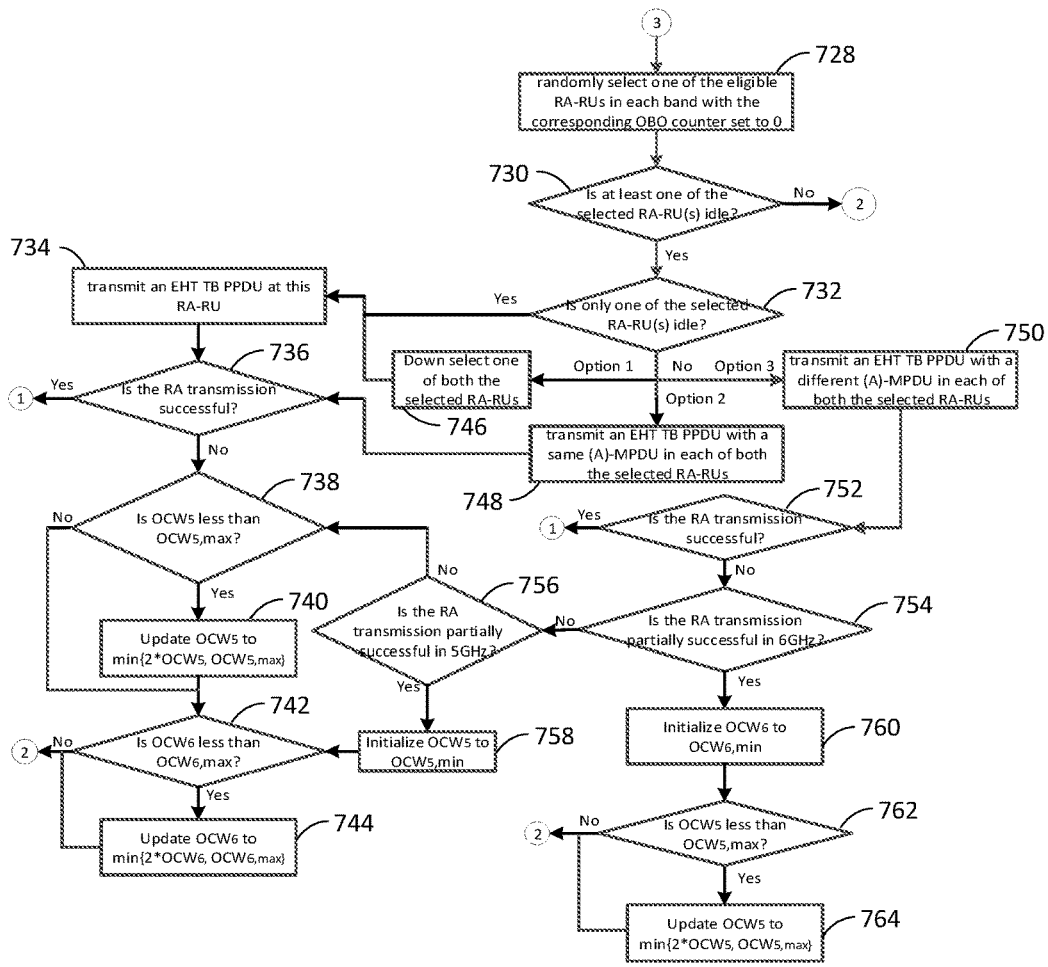
FIG. 10 illustrates a second part of the flow chart for the example method of implementing multi-band UORA according to the second embodiment.

FIGS. 9 and 10 collectively illustrate a flow chart for an example method of implementing multi-band UORA according to the second embodiment at a DB operating STA. The method starts by setting OCW5 to OCW5 min and setting OCW6 to OCW6 min at step 700 and then initializes OBO5 and OBO6 counters at step 710 before waiting until a Trigger frame for RA is received at step 712. At step 714 a determination is made as to whether there are any pending frames for the AP. If not, then the STA reverts back to waiting until a Trigger frame for RA is received at step 712. If so, then a further determination is made as to whether the OBO5 counter is smaller than, or equal to, the number of eligible RA-RUs in the 5 GHz band (i.e. first band) in the Trigger frame at step 716. If so, the OBO5 counter is set to 0 at step 720 and if not, the OBO5 counter is decremented by the number of eligible RA-RUs in the 5 GHz band in the Trigger frame at step 718.

A similar determination is then made in relation to the 6 GHz band (i.e. second band). Namely, a determination is made as to whether the OBO6 counter is smaller than, or equal to, the number of eligible RA-RUs in the 6 GHz band in the Trigger frame at step 722. If so, the OBO6 counter is set to 0 at step 724 and if not, the OBO6 counter is decremented by the number of eligible RA-RUs in the 6 GHz band in the Trigger frame at step 726.

The STA then makes a determination as to whether both OBO5 and OBO6 counters are larger than 0 at step 727. If so, the STA goes back to waiting until a Trigger frame for RA is received at step 712. If not, the STA progresses to randomly select one of the eligible RA-RUs in each band with the corresponding OBO counter set to 0 at step 728 and makes a determination as to whether at least one of the selected RA-RU(s) is idle at step 730. If at least one of the RA-RU(s) is not idle then the OBO5 and OBO6 counters are initialized again at step 710. If at least one of the RA-RU(s)

is idle then a determination is made as to whether if it's only one of the selected RA-RU(s) that is idle at step 732.

If so, the STA transmits an EHT TB PPDU at this RA-RU at step 734. A determination is then made as to whether the RA transmission was successful at step 736. If so, the STA goes back to the first step of setting OCW5 to OCW5 min and OCW6 to OCW6 min at step 700. If not, then a determination is made as to whether OCW5 is less than OCW5max at step 738 and, if so, OCW5 is updated to min{2*OCW5, OCW5max} at step 740. The STA then makes a similar determination as to whether OCW6 is less than OCW6max at step 742 and, if so, OCW6 is updated to min{2*OCW6, OCW6max} at step 744. The STA then goes back to initializing the OBO5 and OBO6 counters at step 710.

If more than one of the selected RA-RUs is determined to be idle at step 732 then there are three proposed options. Option 1 is to down select one of both the selected RA-RUs at step 746 and then proceed to transmitting an EHT TB PPDU at this RA-RU at step 734. Option 2 is to transmit an EHT TB PPDU with the same (A)-MPDU in each of both the selected RA-RUs at step 748 and move on to determining whether the transmission was successful at step 736.

Option 3 is to transmit an EHT TB PPDU which a different (A)-MPDU in each of both the selected RA-RUs at step 750, and then make a determination as to whether the RA transmission was successful at step 752. If so, the STA goes back to the first step of setting OCW5 to OCW5 min and OCW6 to OCW6 min at step 700. If not, then a determination is made as to whether the RA transmission was partially successful in one of the bands, in this example in the second 6 GHz band at step 754. If not a determination is made as to whether the RA transmission was partially successful in another band, in this example in the first 5 GHz band at step 756. If so, then OCW5 is initialized to OCW5 min at step 758 and the STA moves on to step 742 for a determination of whether OCW6 is less than OCW6max. If not, then the STA simply moves on to step 738 for a determination of whether OCW5 is less than OCW5max. If, on the other hand, a determination is made that the RA transmission is partially successful in the 6 GHz band at step 754, the OCW6 is initialized to OCW6 min at step 760 and a further determination is made as to whether the OCW5 is less than OCW5max at step 762. If so, OCW5 is updated to min{2*OCW5, OCW5max} at step 764. The STA then initializes the OBO5 and OBO6 counters at step 710.

Figure 11:
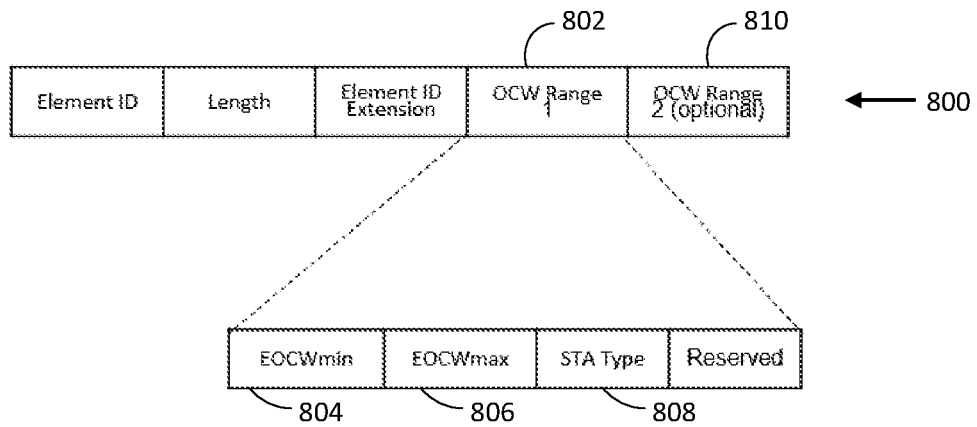
FIG. 11 illustrates an example UORA Parameter Set element according to a third embodiment.
Figure 12:
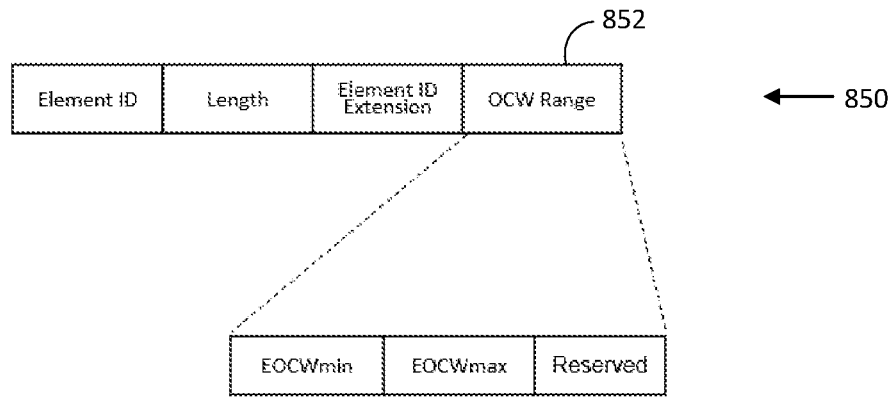
FIG. 12 illustrates another example UORA Parameter Set element according to the third embodiment.

FIGS. 11 and 12 illustrate two example UORA Parameter Set elements according to a third embodiment whereby the OCW range is specific to STA type. Assume OCWDBmin and OCWDBmax represent an OCW range specific to DB operating STAs and OCWSBmin and OCWSBmax represent an OCW range specific to SB operating STAs. According to the third embodiment, OCWSBmin is smaller than OCWDBmin and OCWSBmax is smaller than OCWDBmax.

For one example, illustrated in FIG. 11, the OCW Range 1 field 802 and OCW Range 2 field 810 in the UORA Parameter Set element 800 indicate OCW range for the STA type indicated by the STA Type subfield 808. Similarly to before, the OCW range can be derived from the EOCWmin subfield 804 and the EOCWmax subfield 806.

For another example, illustrated in FIG. 12, the OCW Range field 852 in the UORA Parameter Set element 850 again indicates the OCW range, but for one type of STA (e.g. SB operating STAs), from which the OCW range for the other type of STAs (e.g. DB operating STAs) can be derived according to a predetermined rule. An example rule might be OCWDBmin=2*OCWSBmin and OCWDBmax=2*OCWSBmax.

The UORA Parameter Set element 800, 850 can be included in a management frame such as, for example, a Beacon frame, Probe Response frame, (Re)association Response frame, etc. When the UORA Parameter Set element 800, 850 is included in an individually addressed frame, such as a (Re)association Response frame, it may only include the OCW range specific to the STA type of the intended recipient for the individually addressed frame.

Figure 13:
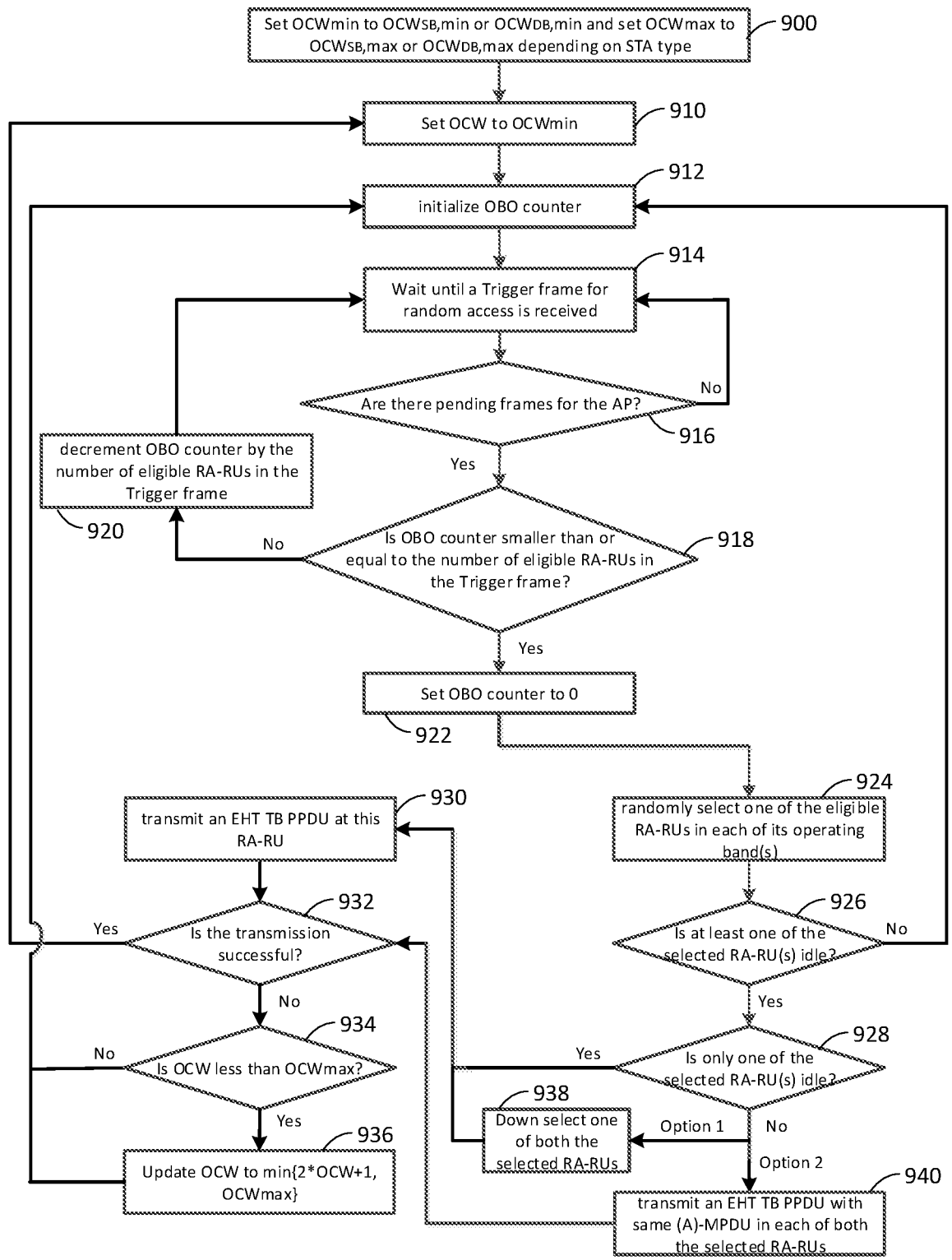
FIG. 13 illustrates a flow chart for an example method of implementing multi-band UORA according to the third embodiment.

FIG. 13 illustrates a flow chart for an example method of implementing multi-band UORA according to the third embodiment at a STA. The method for the third embodiment is similar to that for the first embodiment except the DB operating STAs use OCWDBmin and OCWDBmax instead of OCWmin and OCWmax while the SB operating STAs use OCWSBmin and OCWSBmax instead of OCWmin and OCWmax. As may be appreciated, SB operating STAs have similar contention opportunities to DB operating STAs in the third embodiment since SB operating STAs have smaller OCWmin and OCWmax than DB operating STAs.

The method of this third embodiment starts by setting OCWmin to OCWSBmin or OCWDBmin and setting OCWmax to OCWSBmax or OCWDBmax depending on STA type at step 900. Then OCW is set to OCWmin at step 910 and an OBO counter is initialized at step 912. The STA then waits until a Trigger frame for RA is received at step 914 and then a determination of whether there are pending frames for the AP is made at step 916. If not, then the STA goes back to waiting until a Trigger frame for RA is received at step 914. If so, then a determination is made as to whether the OBO counter is small than, or equal to, the number of eligible RA-RUs in the Trigger frame at step 918. If not, then the OBO counter is decremented by the number of eligible RA-RUs in the Trigger frame at step 920 and the STA goes back to waiting until a Trigger frame for RA is received at step 914. If yes, the OBO counter it set to 0 at step 922.

Next one of the eligible RA-RUs is randomly selected in each of the STA's operating band(s) at step 924 and a determination is made as to whether at least one of the selected RA-RU(s) is idle at step 926. If not, then the OBO counter is initialized again at step 912. If so, then a determination is made as to whether only one of the selected RA-RUs is idle at step 928. If so, then an EHT TB PPDU is transmitted at this RA-RU at step 930 and a determination is made as to whether the transmission was successful at step 932. If so, the STA goes back to the step of setting OCW to OCWmin at step 910. If not, then a determination is made as to whether OCW is less than OCWmax at step 934 and, if so, OCW is updated to min{2*OCW+1, OCWmax} at step 936. The STA then goes back to initializing the OBO counter at step 912.

If more than one of the selected RA-RUs is determined to be idle at step 928, there are two proposed options. Option 1 is to down select one of both the selected RA-RUs at step 938 and then proceed to transmitting an EHT TB PPDU at this RA-RU at step 930. Option 2 is to transmit an EHT TB PPDU with the same (A)-MPDU in each of both the selected RA-RUs at step 940 and then move on to determining whether the transmission was successful at step 932.

FIG. 14 illustrates another example format of the Trigger frame 500 for RA that may schedule some RA-RUs especially for SB operating STAs. The User Info field 510 has various subfields including, in this example, an AID12 subfield. A predetermined value of the AID12 subfield (e.g. 2048) may indicate that the RA-RUs are reserved for associated SB operating STAs. Another predetermined value of the AID12 subfield (e.g. 2049) may indicate that the RA-RUs are reserved for un-associated SB operating STAs. SB operating STAs may still be able to contend other eligible RA-RUs.

A multi-band UORA procedures according to a fourth embodiment utilizing the Trigger frame format 500 of FIG. 14 is the same as the first embodiment except for the definition of what constitutes an eligible RA-RU. For this fourth embodiment, an eligible RA-RU is an RA-RU for which the STA is capable of generating an EHT TB PPDU (i.e., the STA supports all transmit parameters indicated in the Common Info field and in the User Info field corresponding to the RA-RU) and shall satisfy at least one of the following conditions: the STA is a SB operating STA and not associated with the BSS it intends to transmit frames to and the AID12 value of the RA-RU is 2045 or 2049; the STA is a DB operating STA and not associated with the BSS it intends to transmit frames to and the AID12 value of the RA-RU is 2045; the STA is an associated SB operating STA, the TA field of the Trigger frame is set to the BSSID of the associated BSS and the AID12 value of the RA-RU is 0 or 2048; and the STA is an associated DB operating STA, the TA field of the Trigger frame is set to the BSSID of the associated BSS and the AID12 value of the RA-RU is 0. In this fourth embodiment, SB operating STAs have similar contention opportunities to DB operating STAs in UORA since SB operating STAs may have similar number of eligible RA-RUs to DB operating STAs.

Figure 15:
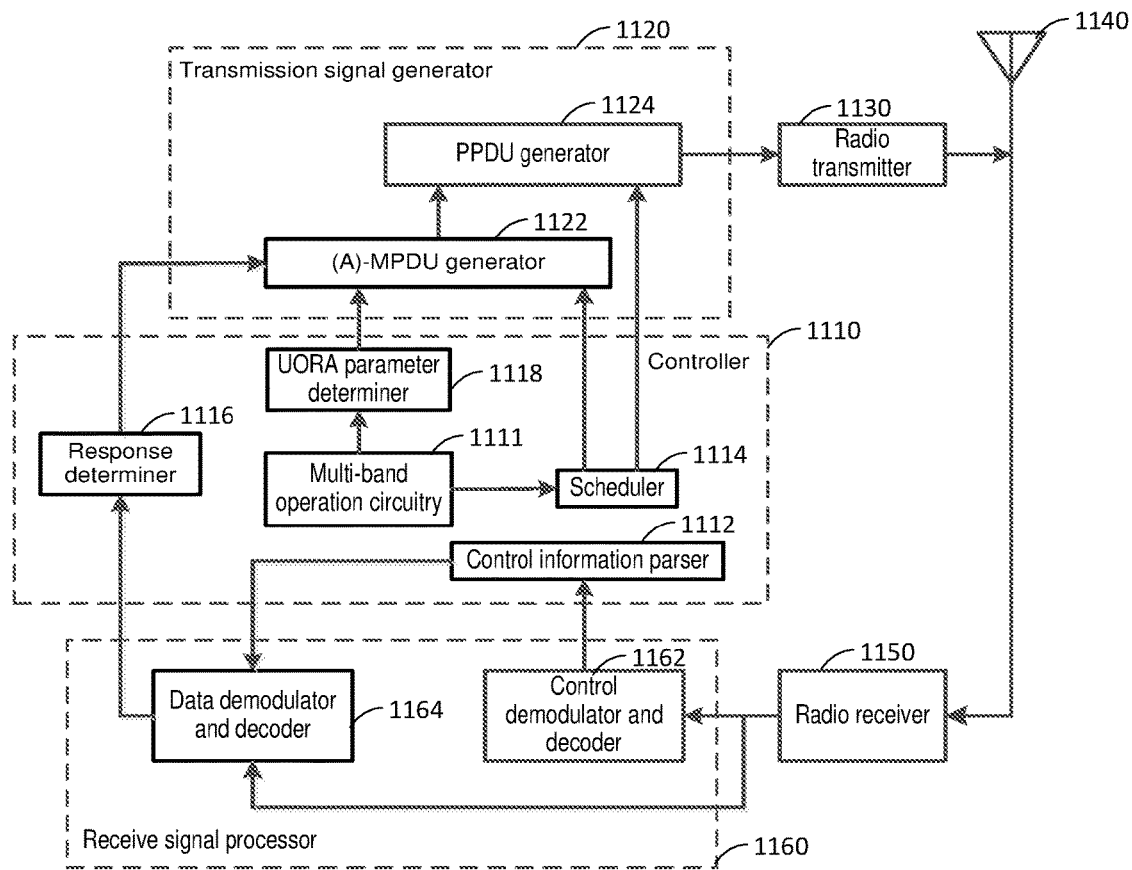
FIG. 15 illustrates an example configuration of an AP in greater detail.

FIG. 15 illustrates an example configuration of an AP 1100, such as the one in FIG. 1 but in greater detail, implementing UORA. The AP 1100 has a controller 1110, a transmission signal generator 1120, a radio transmitter 1130, an antenna 1140, a radio receiver 1150, and a receive signal processer 1160.

The radio receiver 1150 receives signals (e.g. EHT MU PPDUs) from the antenna 1140 and sends them to a control demodulator and decoder 1162 and a data demodulator and decoder 1164 of the receive signal processor 1160. The control demodulator and decoder 1162 decodes control signaling portions of the received signals. The control information parser 1112 analyses the control signaling portions of the received signals and passes the corresponding control information to the data demodulator and decoder 1164. The data demodulator and decoder 1164 decodes the data portions of the received signals (e.g. (A)-MPDUs carried in EHT MU PPDUs) and then communicates with a response determiner 1116 of the controller 1110 which generates acknowledgements on the data portions of the received signals. A multi-band operation circuitry 1111 of the controller 1110 communicates with a scheduler 1114 and an UORA parameter determiner 1118. The UORA parameter determiner 1118 also communicates with a (A)-MPDU generator 1122 which communicates, together with the scheduler 1114, to a PPDU generator 1124 of the transmission signal generator 1120. The multi-band operation circuitry 1111 is in charge of multi-band operation, e.g. determination of the operating bands. The UORA parameter determiner 1118 determines the UORA parameters, e.g. OCW range for each of its operating bands. The scheduler 1114 schedules (A)-MPDU transmission and determine the corresponding transmission parameters. The (A)-MPDU generator 1122 of the transmission signal generator 1120 generates (A)-MPDUs (e.g. Multi-STA BlockAck frames, management frames containing UORA Parameter Set elements, Trigger frames for random access). The PPDU generator 1124 generates PPDUs which are transmitted by the radio transmitter 1130 via the antenna 1140.

Figure 16:
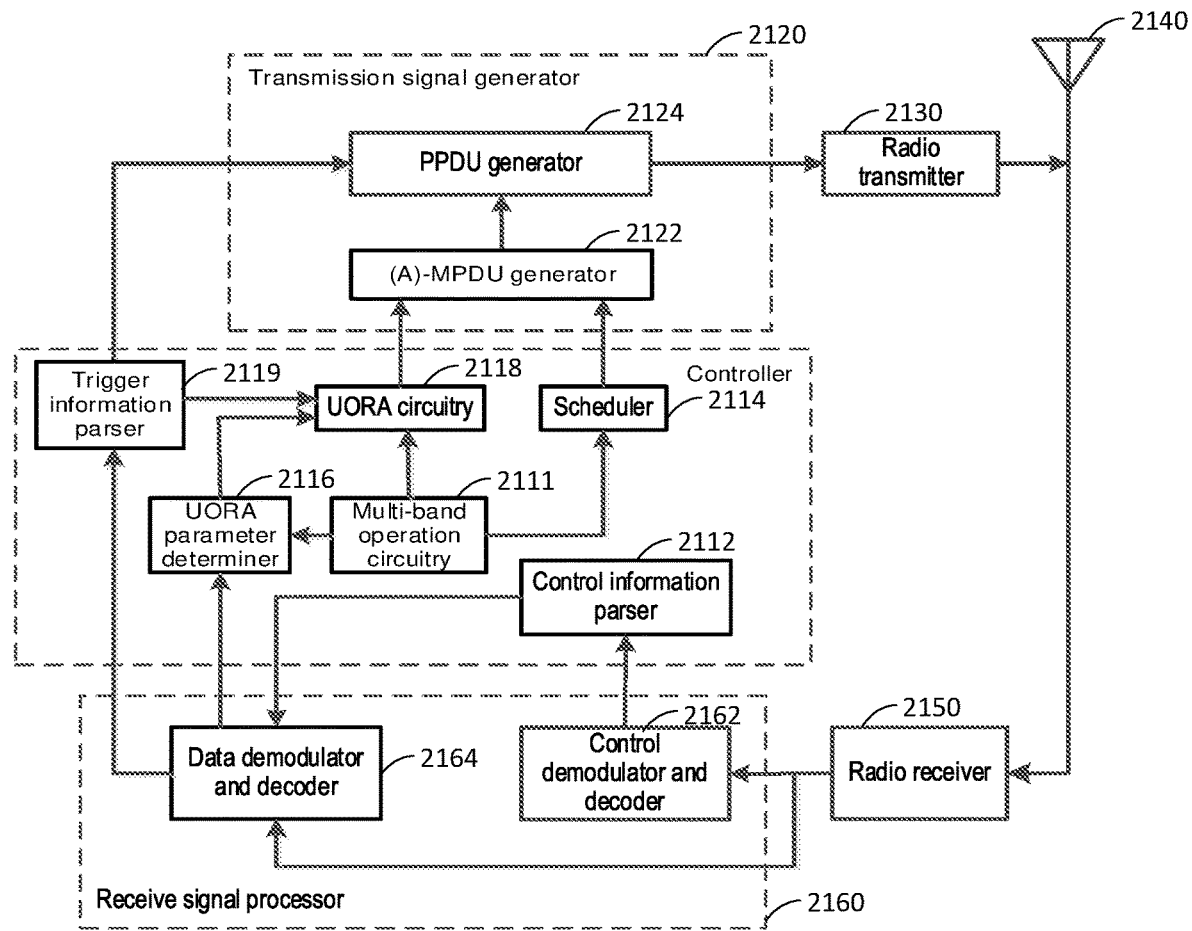
FIG. 16 illustrates an example configuration of a STA in greater detail.

FIG. 16 illustrates an example configuration of a STA implement UORA. The STA 2100 has a controller 2110, a transmission signal generator 2120, a radio transmitter 2130, an antenna 2140, a radio receiver 2150, and a receive signal processer 2160.

The radio receiver 2150 receives signals (e.g. PPDUs containing management frames containing UORA Parameter Set elements, Trigger frames for random access and/or Multi-STA BlockAck frames) from the antenna 2140 and sends them to a control demodulator and decoder 2162 and a data demodulator and decoder 2164 of the receive signal processor 2160. The control demodulator and decoder 2162 decodes control signaling portions of the received signals and communicates with a control information parser 2112 of the controller 2110. The control information parser 2112 analyses the control signaling portions of the received signals and passes the corresponding control information to the data demodulator and decoder 2164. The data demodulator and decoder 2164 decodes data portions of the received signals and then may communicate with a UORA parameter determiner 2116 and a trigger information passer 2119 of the controller 2110 which both communicate with UORA circuitry 2118. The controller 2110 also has multi-band operation circuitry 2111 with communicates with the UORA parameter determiner 2116, the UORA circuitry 2118, and a scheduler 2114. The scheduler 2114 schedules (A)-MPDU transmission and determines the corresponding transmission parameters. The multi-band operation circuitry 2111 is in charge of multi-band operation, e.g. determination of its operating bands. The UORA parameter determiner 2116 determines the UORA parameters, e.g. OCW range for each of its operating bands, according to the received UORA Parameter Set element. The trigger information parser 2119 analyses the trigger information based on the received Trigger frame, e.g. RA-RU information. The UORA circuitry 2118 is in charge of performing UORA procedures based on the UORA parameters and RA-RU information.

The transmission signal generator 2120 has an (A)-MPDU generator 2122, which receives communications from the UORA circuitry 2118 and scheduler 2114 of the controller 2110 and generates (A)-MPDUs. The transmission signal generator 2120 also has a PPDU generator 2124 which receives communications from the (A)-MPDU generator and trigger information parser 2119 of the controller 2110. The PPDU generator may then generates PPDUs which are transmitted by the radio transmitter 2130 via the antenna 2140.

Apparatus of the present disclosure may comprise many other components that are not illustrated for the sake of clarity. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

1. A communication apparatus operating in at least a first band and a second band, the communication apparatus comprising:
   a receiver which, in operation, receives a signal including a Trigger frame allocating at least one Random Access Resource Unit (RA-RU); and
   a controller which, in operation:
   sets a first Orthogonal Frequency Division Multiple Access (OFDMA) random access backoff (OBO) counter according to a number of RA-RUs determined to be eligible in at least one of the first and second bands in the received Trigger frame; and
   randomly selects an eligible RA-RU in each of the at least one of the first and second bands corresponding to the first OBO counter for Trigger Based (TB) Physical layer Protocol Data Unit (PPDU) transmission when the first OBO counter is set to 0;
   wherein the first OBO counter is initialized according to a first OFDMA Contention Window (OCW).

2. The communication apparatus of claim 1, wherein an RA-RU is determined to be eligible if the communication apparatus supports all transmit parameters indicated in a Common Info field of the Trigger frame and in a User Info field of the Trigger frame corresponding to the RA-RU; and if the communication apparatus is not associated with a Basic Service Set (BSS) it intends to transmit to and a predetermined subfield of the User Info field of the Trigger frame corresponding to the RA-RU is a first predetermined number.

3. The communication apparatus of claim 1, wherein an RA-RU is determined to be eligible if the communication apparatus supports all transmit parameters indicated in a Common Info field of the Trigger frame and in a User Info field of the Trigger frame corresponding to the RA-RU; and if the communication apparatus is an associated communication apparatus and a Transmitter Address (TA) field of the Trigger frame is set to a BSS identifier (ID) of an associated BSS and a predetermined subfield of the User Info field of the Trigger frame corresponding to the RA-RU is a second predetermined number.

4. The communication apparatus of claim 1, wherein the first OBO counter corresponds to the first and second bands.

5. The communication apparatus of claim 4, further comprising: a transmitter which, in operation, transmits a first TB PPDU in the selected eligible RA-RU in the first band and a second TB PPDU in the selected eligible RA-RU in the second band if both the selected eligible RA-RUs are considered to be idle, wherein the first and second TB PPDUs carry a same Medium Access Control Protocol Data Unit (MPDU) or Aggregate MPDU.

6. The communication apparatus of claim 1, wherein the range of the first OCW is specific to the type of communication apparatus.

7. The communication apparatus of claim 1, wherein the first OBO counter corresponds to the first band.

8. The communication apparatus of claim 7, wherein the controller circuitry, when in operation:
   sets the second OBO counter according to a number of eligible RA-RUs in the second band in the Trigger frame; and
   randomly selects one eligible RA-RU in the second band for TB PPDU transmission when the second OBO counter is set to 0;
   wherein the second OBO counter is initialized according to a second OCW.

9. The communication apparatus of claim 8, wherein the range of the first OCW is specific to the first band and the range of the second OCW is specific to the second band.

10. The communication apparatus of claim 9, further comprising: a transmitter which, in operation, transmits a first TB PPDU in the selected eligible RA-RU in the first band and a second TB PPDU in the selected eligible RA-RU in the second band if both the selected eligible RA-RUs are considered to be idle, wherein the first and second TB PPDUs carry a same MPDU, or a same A-MPDU, or different MPDUs, or different A-MPDUs.

11. The communication apparatus of claim 1, wherein the Trigger frame comprises a User Info field which includes a subfield, and the subfield is set to a first predetermined value to indicate the RA-RU(s) allocated by the User Info field reserved for associated communication apparatuses operating in one of at least the first band and the second band.

12. The communication apparatus of claim 11, wherein the subfield is set to a second predetermined value to indicate the RA-RU(s) allocated by the User Info field reserved for communication apparatuses which are operating in one of at least the first band and the second band and are not associated with a BSS it intends to transmit to.

13. A communication method for uplink Orthogonal Frequency Division Multiple Access (OFDMA) based random access, the method comprising:
  initializing an Orthogonal Frequency Division Multiple Access (OFDMA) random access backoff (OBO) counter according to a first OFDMA Contention Window (OCW);
  receiving a signal including a Trigger frame having at least one Random Access Resource Unit (RA-RU);
  setting the first OBO counter according to a number of RA-RUs determined to be eligible in at least one of the first and second bands corresponding to a received Trigger frame; and
  randomly selecting an eligible RA-RU in each of the at least one of the first and second bands corresponding to the first OBO counter for trigger-based Physical layer Protocol Data Unit (PPDU) transmission when the first OBO counter is set to 0.

14. The method of claim 13, wherein the first OBO counter corresponds to the first and second bands and the method further comprises:
  transmitting a first TB PPDU carrying a Medium Access Control Protocol Data Unit (MPDU) or Aggregate MPDU in the selected eligible RA-RU in the first band and a second TB PPDU carrying the same MPDU or Aggregate MPDU in the selected eligible RA-RU in the second band if both the selected eligible RA-RUs are considered to be idle.

15. The method of claim 13, wherein the first OBO counter corresponds to the first band and the method further comprises:
  initializing a second OBO counter according to a second OCW;
  setting the second OBO counter according to a number of eligible RA-RUs in the second band in the Trigger frame; and
  randomly selecting one eligible RA-RU in the second band for TB PPDU transmission when the second OBO counter is set to 0.

The invention claimed is:

1. A station (STA) apparatus comprising:
a receiver which, in operation, receives a Trigger frame allocating Random Access Resource Units (RA-RUs) over multiple bands,
  the Trigger frame including a first User Info field that comprises a first Band Indication subfield for specifying a first band among the multiple bands, a first RU Allocation subfield for indicating a first RA-RU of one or more contiguous RA-RUs in the first band specified by the first Band Indication subfield, and a first Number of RA-RU subfield for indicating a number of the contiguous RA-RUs minus one in the first band specified by the first Band Indication subfield; and
a controller which, in operation:
  sets a first Orthogonal Frequency Division Multiple Access (OFDMA) random access backoff (OBO) counter to 0 if an initial value of the first OBO counter is not larger than a number of first eligible RA-RUs in the first band, which is a first subset of contiguous RA-RUs specified by the Trigger frame; and
  randomly selects one of the first eligible RA-RUs in the first band.

2. The STA apparatus of claim 1, wherein an RA-RU is determined to be eligible if the STA apparatus supports all transmit parameters indicated in a Common Info field of the Trigger frame and in the first User Info field of the Trigger frame corresponding to the RA-RU; and if the STA apparatus is not associated with a Basic Service Set (BSS) it intends to transmit to and a predetermined subfield of the first User Info field of the Trigger frame corresponding to the RA-RU is a first predetermined number.

3. The STA apparatus of claim 1, wherein an RA-RU is determined to be eligible if the STA apparatus supports all transmit parameters indicated in a Common Info field of the Trigger frame and in the first User Info field of the Trigger frame corresponding to the RA-RU; and if the STA apparatus is an associated communication apparatus and a Transmitter Address (TA) field of the Trigger frame is set to a BSS identifier (ID) of an associated BSS and a predetermined subfield of the first User Info field of the Trigger frame corresponding to the RA-RU is a second predetermined number.

4. The STA apparatus of claim 1, wherein the first OBO counter corresponds to the multiple bands.

5. The STA apparatus of claim 1, wherein
  the Trigger frame includes a second Band Indication subfield for specifying a second band among the multiple bands, a second RU Allocation subfield for indicating a second RA-RU of one or more contiguous RA-RUs in the second band, and a second Number of RA-RU subfield for indicating a number of the contiguous RA-RUs minus one in the second band, and wherein a second subset of the contiguous RA-RUs specified by the Trigger frame constitutes second eligible RA-RUs in the second band, from which one eligible RA-RU is randomly selected, and
  the STA further comprises:
    a transmitter which, in operation, transmits a first Trigger Based Physical layer Protocol Data Unit (TB PPDU) in the selected first eligible RA-RU in the first band and transmits a second TB PPDU in the selected second eligible RA-RU in the second band if both the selected first eligible RA-RU in the first band and the selected second eligible RA-RU in the second band are considered to be idle, wherein the first and second TB PPDUs carry a same Medium Access Control Protocol Data Unit (MPDU) or Aggregate MPDU.

6. The STA apparatus of claim 1, wherein a range of a first OFDMA Contention Window (OCW), which corresponds to the first OBO counter, is specific to the type of STA apparatus.

7. The STA apparatus of claim 6, wherein the first OBO counter corresponds to the first band.

8. The STA apparatus of claim 6, wherein a second Band Indication subfield further specifies a second band among the multiple bands, and
the controller, when in operation:
sets a second OBO counter to 0 if an initial value of the second OBO counter is not larger than a number of eligible RA-RUs in the second band; and
randomly selects one of the eligible RA-RUs in the second band for Trigger Based Physical layer Protocol Data Unit (TB PPDU) transmission;
wherein the second OBO counter is initialized according to a second OCW.

9. The STA apparatus of claim 8, wherein the range of the first OCW is specific to the first band and a range of the second OCW is specific to the second band.

10. The STA apparatus of claim 9, further comprising:
a transmitter which, in operation, transmits a first TB PPDU in the selected eligible RA-RU in the first band and a second TB PPDU in the selected eligible RA-RU in the second band if both the selected eligible RA-RUs are considered to be idle, wherein the first and second TB PPDUs carry a same Medium Access Control Protocol Data Unit (MPDU), or a same Aggregated MPDU (A-MPDU), or different MPDUs, or different A-MPDUs.

11. The STA apparatus of claim 1, wherein the first User Info field includes a subfield that is set to a first predetermined value to indicate the RA-RU(s) allocated by the first User Info field are reserved for associated STA apparatuses operating in one of the multiple bands.

12. The STA apparatus of claim 11, wherein the subfield is set to a second predetermined value to indicate the RA-RU(s) allocated by the first User Info field are reserved for STA apparatuses which are operating in one of the multiple bands and are not associated with a BSS they intend to transmit to.

13. A communication method for uplink Orthogonal Frequency Division Multiple Access (OFDMA) based random access, the method comprising:
initializing a first Orthogonal Frequency Division Multiple Access (OFDMA) random access backoff (OBO) counter according to a first OFDMA Contention Window (OCW);
receiving a Trigger frame having Random Access Resource Units (RA-RUs) over multiple bands, the Trigger frame including a first User Info field that comprises a first Band Indication subfield for specifying a first band among the multiple bands, a first RU Allocation subfield for indicating a first RA-RU of one or more contiguous RA-RUs in the first band specified by the first Band Indication subfield, and a first Number of RA-RU subfield for indicating a number of the contiguous RA-RUs minus one in the first band specified by the first Band Indication subfield;
setting the first OBO counter to 0 if an initial value of the first OBO counter is not larger than a number of first eligible RA-RUs in the first band, which is a first subset of contiguous RA-RUs specified by the Trigger frame; and
randomly selecting one of the first eligible RA-RUs in each of the multiple bands.

14. The method of claim 13, further comprising:
randomly selecting one of eligible RA-RUs in a second band further specified by a second Band Indication subfield; and
transmitting a first Trigger Based Physical layer Protocol Data Unit (TB PPDU) carrying a Medium Access Control Protocol Data Unit (MPDU) or Aggregate MPDU in the selected eligible RA-RU in the first band and a second TB PPDU carrying the same MPDU or Aggregate MPDU in the selected eligible RA-RU in the second band if both the selected eligible RA-RUs are considered to be idle.

15. The method of claim 13, wherein a second Band Indication subfield further specifies a second band among the multiple bands, and the method further comprising:
initializing a second OBO counter according to a second OCW;
setting the second OBO counter to 0 if an initial value of the second OBO is not larger than a number of eligible RA-RUs in the second band, which is a second subset of the contiguous RA-RUs in the Trigger frame; and
randomly selecting one of the eligible RA-RUs in the second band for Trigger Based Physical layer Protocol Data Unit (TB PPDU) transmission.

\* \* \* \* \*